United States Patent
Baek et al.

(10) Patent No.: US 9,060,264 B2
(45) Date of Patent: Jun. 16, 2015

(54) SECURE COMMUNICATION METHOD AND SYSTEM IN NETWORK ENVIRONMENT WHICH INCLUDES TRANSMITTER, RECEIVER, AND WIRETAPPER

(71) Applicant: Electronics & Telecommunications Research Institute, Daejeon (KR)

(72) Inventors: Young Seok Baek, Daejeon (KR); Bon Tae Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 208 days.

(21) Appl. No.: 13/740,561

(22) Filed: Jan. 14, 2013

(65) Prior Publication Data
US 2013/0273947 A1    Oct. 17, 2013

(30) Foreign Application Priority Data
Apr. 17, 2012    (KR) .......................... 10-2012-0039802

(51) Int. Cl.
*H04W 12/02*    (2009.01)
*H04B 7/04*    (2006.01)
*H04B 7/08*    (2006.01)

(52) U.S. Cl.
CPC .............. *H04W 12/02* (2013.01); *H04B 7/086* (2013.01)

(58) Field of Classification Search
None
See application file for complete search history.

(56) References Cited

U.S. PATENT DOCUMENTS

2011/0158347 A1 *    6/2011    Yeh et al. ...................... 375/296

FOREIGN PATENT DOCUMENTS

| KR | 10-2008-0067680 | 7/2008 |
| WO | WO 2007/054665 | 5/2007 |

* cited by examiner

*Primary Examiner* — Philip Sobutka
(74) *Attorney, Agent, or Firm* — Staas & Halsey LLP

(57) ABSTRACT

Disclosed are a secure communication method and system. In a wireless communication environment in which there is a wiretapper wiretapping a signal transmitted by a first transmitter to a first receiver, the secure communication method calculates a beamforming vector including first and second beamforming vectors based on channel information between the second transmitter and the first receiver and channel information between the second transmitter and a second receiver, and performs beamforming on the first and second receivers with the calculated beamforming vector. Accordingly, even when it is unable to know channel information of a wiretapper, the secure communication method can satisfy the minimum service-quality requirements of a secondary user and maximize a primary user's secure ability.

9 Claims, 3 Drawing Sheets

US 9,060,264 B2

SECURE COMMUNICATION METHOD AND SYSTEM IN NETWORK ENVIRONMENT WHICH INCLUDES TRANSMITTER, RECEIVER, AND WIRETAPPER

CLAIM FOR PRIORITY

This application claims priority to Korean Patent Application No. 10-2012-0039802 filed on Apr. 17, 2012 in the Korean Intellectual Property Office (KIPO), the entire contents of which are hereby incorporated by reference.

BACKGROUND

1. Technical Field

Example embodiments of the present invention relate in general to wireless communication technology, and more specifically, to a secure communication method and system that can be applied to a network environment in which a transmitter does not know channel information of a wiretapper.

2. Related Art

A wireless communication system is a system that transmits and receives a signal through air. The wireless communication system uses air that is an opened medium, and thus, when an unauthorized user knows processing information on a transmission signal, there is a risk in which the unauthorized user wiretaps the transmission signal and easily acquires secret information.

As the concept of a secrecy capacity is introduced to a wireless communication environment in which there is a wiretap channel, research related to secure technology is started to be conducted in a physical layer of the wireless communication system.

Generally, the secrecy capacity is a value that is obtained by subtracting a transmittable channel capacity between a transmitter and a wiretapper from a transmittable channel capacity between the transmitter and a receiver.

However, in a wireless communication channel, since a channel state is frequently changed, the secrecy capacity of the wiretap channel frequently has a positive value and a value of 0.

As described above, a method of installing and using a helper node has been proposed to overcome the limitation of a channel capacity that is changed depending on a channel condition and provide a stable secrecy capacity.

Korean Unexamined Patent Application Publication No. 10-2008-67680 discloses a secure communication method in which that a first transmitter transmits a noise signal through a communication channel having a range used by a receiver in order to provide secure communication with no encryption, and the receiver receives information transmitted by a second transmitter through one or more communication channels having a certain range and distinguishes transmission by the second transmitter from the noise signal by using information provided from the first transmitter on the noise signal.

However, in Korean Unexamined Patent Application Publication No. 10-2008-67680, the secure communication method cannot be performed when the first transmitter does not know communication channel information of the receiver, and moreover, since the first transmitter needs to separately provide noise signal information to the receiver, an overhead increases.

SUMMARY

Accordingly, example embodiments of the present invention are provided to substantially obviate one or more problems due to limitations and disadvantages of the related art.

Example embodiments of the present invention provide a secure communication method for enhancing a secure function in an environment in which a transmitter does not know channel information of a wiretapper.

Example embodiments of the present invention also provide a secure communication system for enhancing a secure function in an environment in which a transmitter does not know channel information of a wiretapper.

In some example embodiments, a secure communication method, which is performed by a second transmitter in a wireless communication environment in which there is a wiretapper wiretapping a signal transmitted by a first transmitter to a first receiver, includes: calculating a beamforming vector including first and second beamforming vectors based on channel information between the second transmitter and the first receiver and channel information between the second transmitter and a second receiver; and performing beamforming on the first and second receivers with the calculated beamforming vector.

The calculating of a beamforming vector may include calculating a first beamforming vector for beamforming in a direction that does not cause interference to the first receiver, and calculating a second beamforming vector for satisfying minimum service-quality requirements of the second receiver.

The first beamforming vector may be a Zero-Forcing (ZF) beamforming vector that is calculated based on the channel information between the second transmitter and the first receiver and the channel information between the second transmitter and the second receiver, and the second beamforming vector may be a Maximum Ratio Transmission (MRT) beamforming vector that is calculated based on the channel information between the second transmitter and the second receiver.

In the calculating of a beamforming vector, the beamforming vector may be calculated through linear combination of the ZF beamforming vector and MRT beamforming vector and a real-number constant between 0 and 1.

In other example embodiments, a secure communication system, including a wiretapper that wiretaps a signal transmitted by a first transmitter to a first receiver, includes: a second transmitter configured to cooperate with secure communication of the first transmitter by performing beamforming with a plurality of antennas; and a second receiver configured to receive a signal transmitted from the second transmitter, wherein the second transmitter calculates a beamforming vector for performing beamforming on the first and second receivers irrespective of channel information between the second transmitter and the wiretapper.

The second transmitter may calculate a first beamforming vector for beamforming in a direction that does not cause interference to the first receiver, and calculate a second beamforming vector for satisfying minimum service-quality requirements of the second receiver.

The first beamforming vector may be a ZF beamforming vector that is calculated based on the channel information between the second transmitter and the first receiver and the channel information between the second transmitter and the second receiver, and the second beamforming vector may be an MRT beamforming vector that is calculated based on the channel information between the second transmitter and the second receiver.

The second transmitter may calculate the beamforming vector through linear combination of the ZF beamforming vector and MRT beamforming vector and a real-number constant between 0 and 1.

Each of the first transmitter and first receiver may be a primary user's communication device leasing a frequency, and each of the second transmitter and second receiver may be a secondary user's communication device that leases a frequency from the primary user.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
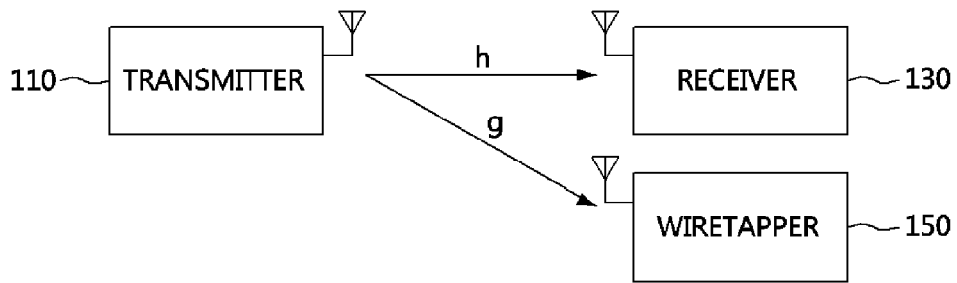
FIG. 1 is a conceptual diagram illustrating a wireless communication system in which there is a wiretapper.

The invention may have diverse modified embodiments, and thus, example embodiments are illustrated in the drawings and are described in the detailed description of the invention.

However, this does not limit the invention within specific embodiments and it should be understood that the invention covers all the modifications, equivalents, and replacements within the idea and technical scope of the invention. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

FIG. 1 is a conceptual diagram illustrating a wireless communication system in which there is a wiretapper.

As an example, FIG. 1 illustrates a wireless communication environment in which a transmitter 110 transmits a signal to a receiver 130, the receiver 130 receives the signal transmitted from the transmitter 110, and a wiretapper 150 wiretaps the signal transmitted from the transmitter 110.

In FIG. 1, it is assumed that h is a channel between the transmitter 110 and the receiver 130, x is a signal transmitted by the transmitter 110, and g is a channel between the transmitter 110 and the wiretapper 150, signals respectively received by the receiver 130 and the wiretapper 150 may be expressed as Equation (1).

$$y_r = hx + n_r$$
$$y_e = gx + n_e \quad (1)$$

where $y_r$ denotes a signal received by the receiver 130, $y_e$ denotes a signal received by the wiretapper 150, $n_r$ denotes noise that occurs in an operation in which the receiver 130 receives a signal, and $n_e$ denotes noise that occurs in an operation in which the wiretapper 150 receives a signal.

When $P_t$ is assumed as power which the transmitter 110 uses, a secrecy capacity $C_{secret}$ may be calculated as expressed in Equation (2). Here, the secrecy capacity denotes the maximum transmission amount that enables the transmitter 110 to transmit information to the receiver 130 without an error and disables the wiretapper 150 to receive information.

$$C_{secret} = \left[\log\left(1 + \frac{P_t|h|^2}{\sigma_r^2}\right) - \log\left(1 + \frac{P_t|g|^2}{\sigma_e^2}\right)\right]^+ \quad (2)$$

where $\sigma_r^2$ denotes a noise dispersion conforming to a Gaussian distribution of the receiver 130, and $\sigma_e^2$ denotes a noise dispersion conforming to a Gaussian distribution of the wiretapper 150.

Equation (2) denotes that a secrecy capacity is obtained by subtracting a transmittable channel capacity between the transmitter 110 and the wiretapper 150 from a transmittable channel capacity between the transmitter 110 and the receiver 130, and thus, when a channel between the transmitter 110 and the wiretapper 150 is better than a channel between the transmitter 110 and the receiver 130, the secrecy capacity may become 0.

Moreover, in a wireless communication channel, since a channel state is frequently changed, a secrecy capacity of a wiretap channel frequently has a positive value and a value of 0.

Therefore, as illustrated in FIG. 1, a method using a helper node installed in a basic wiretap channel model has been proposed to overcome the limitation of a channel capacity that is changed depending on a channel condition and provide a stable secrecy capacity.

Figure 2:
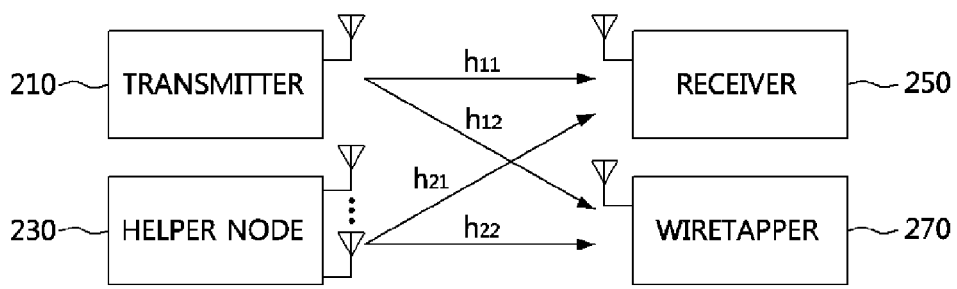
FIG. 2 is a conceptual diagram illustrating a wireless communication system in which there are a wiretapper and a helper node.

FIG. 2 is a conceptual diagram illustrating a wireless communication system in which there are a wiretapper and a helper node.

As an example, FIG. 2 illustrates a case in which a helper node 230 performs multi-antenna signal processing and thus enhances a secrecy capacity between the transmitter 210 and the receiver 250, in a wireless communication environment in which a transmitter 210 transmits a signal to a receiver 250, the receiver 250 receives the signal transmitted from the transmitter 210, and a wiretapper 270 wiretaps the signal transmitted from the transmitter 210.

In the wireless communication environment as illustrated in FIG. 2, a secrecy capacity that can be obtained through a beamforming vector used for the helper node 230 transmitting a signal using a multi-antenna may be expressed as Equation (3).

$$R_{secret} = \left[ \log\left(1 + \frac{P_t|h_{11}|^2}{\sigma_r^2 + |w^*h_{21}|^2}\right) - \log\left(1 + \frac{P_t|h_{22}|^2}{\sigma_e^2 + |w^*h_{12}|^2}\right) \right]^+ \quad (3)$$

where $P_t$ denotes the maximum power of the transmitter 210 and helper node 230. Also, $h_{11}$ denotes a channel between the transmitter 210 and the receiver 250, $h_{12}$ denotes a channel between the transmitter 210 and the wiretapper 270, $h_{21}$ denotes a channel between the helper node 230 and the receiver 250, and $h_{22}$ denotes a channel between the helper node 230 and the wiretapper 270. Also, w denotes a transmission beamforming vector of the helper node 230.

In the wireless communication environment as illustrated in FIG. 2 including the helper node 230, as illustrated in FIG. 1, the limitation of a secrecy capacity dependent on a channel condition of a wiretap channel can be overcome by realizing the transmission beamforming vector "w" of the helper node 230.

That is, by using the helper node 230, a high secrecy capacity can be secured even when a channel environment between the transmitter 210 and the receiver 250 is not better than a channel environment between the transmitter 210 and the wiretapper 270.

However, as described above, in the method using the helper node 230 for the secure communication, since a spare node should be additionally installed, the cost increases, and thus, there is very low possibility that the method using the helper node 230 is actually applied.

In the secure communication method according to an embodiment of the present invention, a wireless cognitive radio system uses a secondary user terminal as a helper node for enhancing a secrecy capacity of a primary user terminal. Accordingly, the secure communication method which increases a secrecy capacity at low cost without installing an additional node is provided.

That is, the present invention provides the secure communication method in which a secondary user's transmitter helps a primary user's communication by performing beamforming for enhancing a secure ability of a primary user's communication device, in a frequency leasing environment in which a transmitter cannot know channel information (i.e., wiretap channel information) of a wiretapper.

Here, a frequency leasing system means a system that leases a frequency, allocated to the primary user, to the secondary user (leaser) through only notification without prior approval of the Federal Communication Commission (FCC) under a condition in which the primary user (license holder) possesses a legal authority and real controllability.

In the frequency leasing system, the primary user's communication device and the secondary user's communication device may simultaneously transmit data by using the same frequency, and interference, which is caused to the primary user's receiver by the secondary user's communication device transmitting a signal simultaneously, is limited to within a range that does not violate the primary user's communication service (minimum amount of required data).

In this case, a cooperative method in which the secondary user's communication device helps to enhance the performance of the primary user's communication device is required for compensating for a disadvantage of the primary user that is caused by leasing a frequency to the secondary user.

The secure communication method according to an embodiment of the present invention provides a method in which the secondary user's communication device maintains the quality of a communication service and performs beamforming for enhancing the security of the primary user's communication device, in a frequency leasing environment in which the primary user's communication device does not know channel information of a wiretapper.

Hereinafter, in the secure communication method according to an embodiment of the present invention, in consideration of effects of unstable wiretap channel information on the transmission technique design of the secondary user's communication device, the optimal beamforming strategy performed by the secondary user's communication device is composed of a convex optimization problem, and the optimal beamforming method of the secondary user's communication device is provided based on the convex optimization problem.

Figure 3:
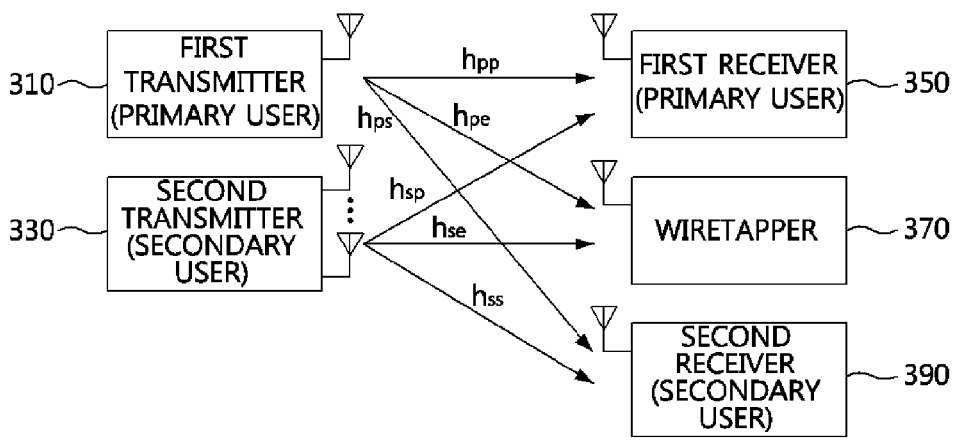
FIG. 3 is a conceptual diagram illustrating an example of a wireless communication system to which a secure communication method according to an embodiment of the present invention is applied.

FIG. 3 is a conceptual diagram illustrating an example of a wireless communication system to which a secure communication method according to an embodiment of the present invention is applied.

As illustrated in FIG. 3, the wireless communication method according to an embodiment of the present invention may be applied to a wireless communication system that includes a first transmitter 310, a first receiver 350, a second transmitter 330, a second receiver 390, and a passive wiretapper 370.

Here, the first transmitter 310 and the first receiver 350 may be configured as a primary user's devices possessing a license, and the second transmitter 330 and the second receiver 390 may be configured as a secondary user's devices that lease a frequency from the primary user. The passive wiretapper 370 may mean a device that does not perform separate active processing for wiretapping a signal, and wiretaps a received signal.

Moreover, in the secure communication method according to an embodiment of the present invention, for convenience of a description, it is assumed that only the second transmitter 330 uses a multi-antenna, and the first transmitter 310, the first receiver 350, the second receiver 390, and the wiretapper 370 use a single antenna.

Moreover, in the secure communication method according to an embodiment of the present invention, an unstable channel information possession environment is assumed in which it is unable to know channel information between the first transmitter 310 and the wiretapper 370 for considering an actual wireless communication environment, but the first transmitter 310 and the second transmitter 330 may know channel information on all links other than channel information between the first transmitter 310, second transmitter 330, and wiretapper 370.

In a wireless communication environment of FIG. 3, all receivers including the wiretapper 370 are affected by interference caused by a received signal other than a signal to be received. In the present invention, an interference signal is regarded as additional noise, which is justified by that most receivers are designed to have a simple configuration in an actual wireless communication environment.

Moreover, a transmission method of each of the first and second transmitters 310 and 330 is assumed as using beamforming and scalar coding. Also, transmission power of each of the first and second transmitters 310 and 330 is assumed as 1 because of not affecting a beamforming technique of the second transmitter 330.

Under the above-described assumption, a secure data amount of the first transmitter 310 may be expressed as Equation (4).

$$R_p(w) = \left[\log\left(1 + \frac{|h_{pp}|^2}{\sigma_p^2 + |w^*h_{sp}|^2}\right) - \log\left(1 + \frac{|h_{pe}|^2}{\sigma_p^2 + |w^*h_{se}|^2}\right)\right]^+ \quad (4)$$

where w denotes an N×1 beamforming vector of the second transmitter 330 that satisfies a transmission power requirement condition of "$\|w\|^2 \leq 1$", and each of and $h_s$, denotes a complex-valued channel constant or an N×1 channel vector between corresponding devices (or nodes) when satisfying i,j∈{p, s, e}. Also, each of $\sigma_p^2$ and $\sigma_e^2$ denotes a standard deviation of Gaussian noises having an average of 0 which occurs in a reception signal of each of the first receiver 350 and wiretapper 370.

An amount of data obtainable from a channel between the second transmitter 330 and the second receiver 390 is expressed as Equation (5).

$$R_s(w) = \log\left(1 + \frac{|w^*h_{ss}|^2}{\sigma_s^2 + |h_{ps}|^2}\right) \quad (5)$$

where $\sigma_s^2$ denotes a standard deviation of Gaussian noises having an average of 0 which occurs in a reception signal of the second receiver 390.

The following description will be made on the optimal transmission method of the second transmitter 330 for securing a physical layer according to a secure data amount of the first transmitter 310 which is a primary user's communication device and a secure data amount of the second transmitter 330 that is a secondary user's communication device.

Here, for example, on the assumption that the secure communication method is applied to a frequency leasing environment for the security of the physical layer, the following description will be made on a case in which the second transmitter 330 consumes limited transmission power and maintains the minimum service quality for a communication link thereof, and simultaneously maximally helps to enhance the security of the first transmitter 310.

Therefore, the optimal beamforming vector "$w_{opt}$" of the second transmitter 330 may be obtained by calculating the optimal solution of P1 expressed in Equation (6).

$$P1: \max_{w} R_p(w) \quad (6)$$
$$\text{s.t. } \|w\|^2 \leq 1$$
$$R_s(w) \geq R_{min}$$

where $R_{min}$ denotes the minimum data requirement amount of the second transmitter 330, and may be defined as expressed in Equation (7).

$$R_{min} = \alpha R_{s,max} \quad (7)$$

where α satisfies α∈[0,1] denotes a constant indicating a Quality of Service (QoS) level of the second transmitter 330, and $R_{s,max}$ may be expressed as Equation (8) and denotes the maximum amount of data that the second transmitter 330 is capable of obtaining through a link $$R_{s,max} = \log\left(1 + \frac{\|h_{ss}\|^2}{\sigma_s^2 + |h_{ps}|^2}\right) \quad (8)$$

where the optimal solution of P1 expressed in Equation (6) is a beamforming method expressed in Equation (9) proposed in "Spectrum leasing via cooperation for enhanced physical-layer secrecy" disclosed in 2011 IEEE International Conference on Communications.

$$w_{opt} = v_{max}\{Z\},\ Z = \lambda_1 h_{se}h_{se}^* + \lambda_2 h_{ss}h_{ss}^* - \lambda_3 h_{sp}h_{sp}^* \quad (9)$$

$$\lambda_k \in [0,1],\ \sum_{k=1}^{3}\lambda_k = 1$$

where $v_{max}(X)$ denotes a principal eigenvector of X.

The beamforming method expressed in Equation (9) is not matched with the above-described assumption of the present invention because a transmitter needs all channel information including channel information of the wiretapper 370.

Therefore, as described above, the secure communication method according to an embodiment of the present invention considers the transmission method of the second transmitter 330 requiring no channel information of the wiretapper 370, on the assumption that a transmitter possesses unstable channel information.

The optimal solution "w" of P1 expressed in Equation (6) considers the maximum transmission power and the minimum service quality of the second receiver 390, and maximizes the secure data amount of the first transmitter 310.

However, in the secure communication method according to an embodiment of the present invention, the second transmitter 330 prevents the generation of an interference signal hindering the wiretapper 370 by using the channel information of the wiretapper 370, on the assumption that a transmitter possesses unstable channel information.

Therefore, in an environment in which the second transmitter 330 does not know the channel information of the wiretapper 370, the optimal transmission strategy of the second transmitter 330 is to maintain the minimum service quality and propagate an interference signal to a space that causes minimum interference to the first receiver 350.

That is, in order to satisfy the minimum service quality of the second receiver 390, the second transmitter 330 allocates the minimum power to a signal transmitted to the second receiver 390, and then generates an interference signal in a direction that minimizes interference caused to the first receiver 350, and performs beamforming with residual power for maximizing security enhancement between the first transmitter 310 and the first receiver 350.

Therefore, the secure communication method according to an embodiment of the present invention composes an optimization problem expressed in Equation (10), in consideration of the influence of the assumption that a transmitter possesses unstable channel information.

$$P2: \min_{w} |w^*h_{sp}|^2 \quad (10)$$
$$\text{s.t. } \|w\|^2 \leq 1$$
$$R_s(w) \geq R_{min}$$

As expressed in Equation (11), the optimal solution of Equation (10) is expressed as linear combination of a Zero-Forcing (ZF) beamforming vector and a Maximum Ratio Transmission (MRT) beamforming vector.

$$w_{opt} = \frac{\lambda w^{ZF} + (1-\lambda)w^{MRT}}{\|\lambda w^{ZF} + (1-\lambda)w^{MRT}\|} \quad (11)$$

where $\lambda$ is $0 \leq \lambda \leq 1$, and the ZF beamforming vector "$w^{ZF}$" and the MRT beamforming vector "$w^{MRT}$" are defined as expressed in Equation (12).

$$w^{ZF}=P_{h_{sp}}^{\perp}h_{ss}/\|P_{h_{sp}}^{\perp}h_{ss}\|, w^{MRT}=h_{ss}/\|h_{ss}\| \quad (12)$$

where the ZF beamforming vector is a vector that does not cause interference to the first receiver 350, and, as described above, the MRT beamforming vector is a beamforming vector that supports the maximum data amount to the second receiver 390.

The optimal solution of P2 is obtained through linear combination of the ZF beamforming vector and MRT beamforming vector and a real-number constant "$\lambda$" between 0 and 1.

Figure 4:
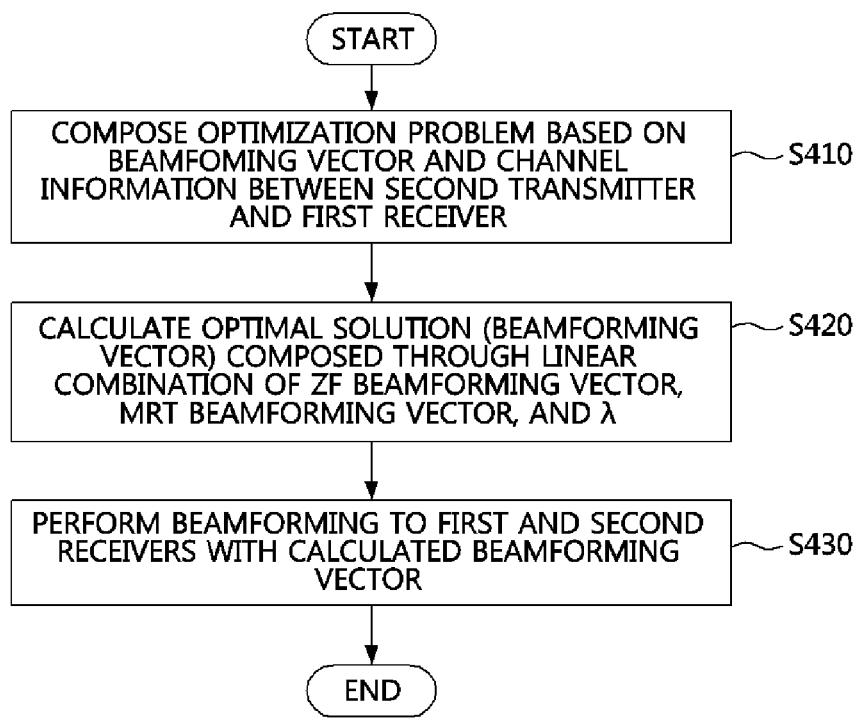
FIG. 4 is a flowchart illustrating a secure communication method according to an embodiment of the present invention.

FIG. 4 is a flowchart illustrating a secure communication method according to an embodiment of the present invention.

When it is unable to know channel information between the first and second transmitters and the wiretapper in the wireless communication environment of FIG. 3, the secure communication method according to an embodiment of the present invention is performed by the second transmitter, which is a secondary user's communication device, for maximizing the secure data amount (or secrecy capacity) of the first transmitter that is a primary user's communication device.

First, as expressed in Equation (10), the second transmitter composes an optimization problem on the basis on a beamforming vector and channel information between the second transmitter and the first transmitter, within a range satisfying the minimum service-quality requirements of the second receiver in operation S410.

Subsequently, the second transmitter calculates the optimal solution of the composed optimization problem in operation S420. Here, as expressed in Equation (11), the optimal solution may be obtained through linear combination of the ZF beamforming vector (which does not cause interference to the first receiver) and MRT beamforming vector (which supports the maximum data amount to the second receiver) and a real-number constant "$\lambda$" between 0 and 1.

Moreover, as expressed in Equation (12), the ZF beamforming vector is calculated based on channel information between the second transmitter and the first receiver and channel information between the second transmitter and the second receiver, and the MRT beamforming vector is calculated based on channel information between the second transmitter and the second receiver.

Subsequently, as described above, the second transmitter performs beamforming to the first receiver and the second receiver by using the obtained beamforming vector in operation S430.

Figure 5:
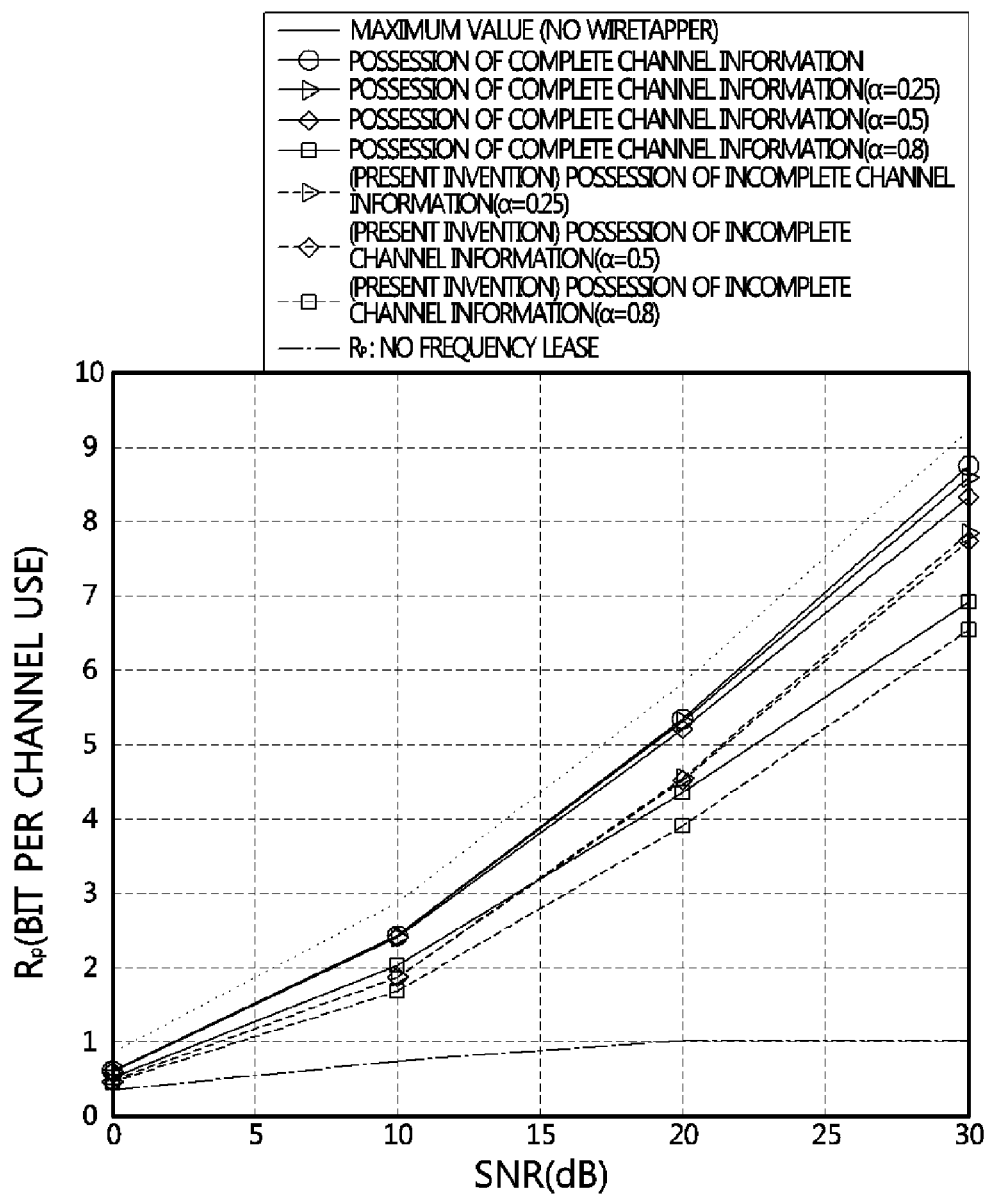
FIG. 5 is a graph showing performance of the secure communication method according to an embodiment of the present invention.

FIG. 5 is a graph showing performance of the secure communication method according to an embodiment of the present invention.

In FIG. 5, an average data amount of the primary user that has been obtained by the secure communication method according to an embodiment of the present invention when the second transmitter possesses all channel information including the channel information of the wiretapper is compared with an average data amount of the primary user that has been obtained by the secure communication method when the second transmitter does not possess the channel information of the wiretapper in an environment in which the secondary user (or second receiver) requires different service qualities, and the compared result is shown.

Here, 0.25, 0.5, and 0.8 are used as the QoS levels ($\alpha$) of the second receiver, and the second transmitter is assumed as including four antennas.

Referring to FIG. 5, in applying the secure communication method according to an embodiment of the present invention, due to the beamforming of the second transmitter, the secure data amount of the primary user when the second transmitter does not know the channel information of the wiretapper is similar to the secure data amount of the primary user when the second transmitter possesses all channel information.

Therefore, when the secure communication method according to an embodiment of the present invention is applied to the secondary user's communication device in the frequency leasing environment in which there is the wiretapper, it can be seen that the secure communication method supports the minimum service quality and enhances the primary user's secure function even when the secondary user's communication device (second transmitter) does not know the channel information of the wiretapper.

Moreover, as shown in FIG. 5, as the minimum service quality of the secondary user increases, a difference between the secure data amount of the primary user and the secure data amount of the secondary user decreases by possessing the channel information of the wiretapper. This denotes that as the minimum service quality of the secondary user increases, the optimal beamforming vector of the secondary user converges on the MRT beamforming vector, and thus, the necessity for the transmitter to posses the channel information of the wiretapper is reduced.

Accordingly, it can be seen that as the minimum service quality of the secondary user increases, the secure communication method according to an embodiment of the present invention is more effective in enhancing the primary user's secure function.

As described above, in the secure communication method according to an embodiment of the present invention, even when it is unable to know the channel information of the wiretapper, the secondary user's communication device performs optimal beamforming, and thus can support the minimum service quality of the secondary user and moreover enhance the security of the primary user.

According to the above-described secure communication method and system, the secondary user's transmitter calculates the optimal beamforming vector that is composed of the ZF beamforming vector and the MRT beamforming vector, and performs beamforming to the primary user's receiver and the secondary user's receiver with the calculated beamforming vector, in the frequency leasing environment in which the secondary user's transmitter cannot know channel information of the wiretapper.

Accordingly, even when it is unable to know channel information of the wiretapper, the secure communication method and system can satisfy the secondary user's minimum requirement for service quality, and maximize the primary user's secure ability.

While the example embodiments of the present invention and their advantages have been described in detail, it should be understood that various changes, substitutions and alterations may be made herein without departing from the scope of the invention.

What is claimed is:

1. A secure communication method, which is performed by a second transmitter in a wireless communication environment in which there is a wiretapper wiretapping a signal transmitted by a first transmitter to a first receiver, the method comprising:
  determining an optimization influence of the second transmitter based on channel information of the second transmitter and the first transmitter;
  calculating a beamforming vector comprising first and second beamforming vectors based on channel information between the second transmitter and the first receiver and channel information between the second transmitter and a second receiver, according to the optimization influence; and
  performing beamforming on the first receiver and the second receiver with the calculated beamforming vector,
  wherein the second transmitter is configured as a secondary user's device that leases a frequency allocated to a primary user corresponding to the first transmitter.

2. The secure communication method of claim 1, wherein the calculating of the beamforming vector comprises calculating a first beamforming vector for beamforming in a direction that does not cause interference to the first receiver, and calculating a second beamforming vector for satisfying minimum service-quality requirements of the second receiver.

3. The secure communication method of claim 1, wherein,
  the first beamforming vector is a Zero-Forcing (ZF) beamforming vector that is calculated based on the channel information between the second transmitter and the first receiver and the channel information between the second transmitter and the second receiver, and
  the second beamforming vector is a Maximum Ratio Transmission (MRT) beamforming vector that is calculated based on the channel information between the second transmitter and the second receiver.

4. The secure communication method of claim 3, wherein in the calculating of the beamforming vector, the beamforming vector is calculated through linear combination of the ZF beamforming vector and MRT beamforming vector and a real-number constant between 0 and 1.

5. A secure communication system, including a wiretapper that wiretaps a signal transmitted by a first transmitter to a first receiver, the system comprising:
  a second transmitter configured to cooperate with secure communication of the first transmitter by performing beamforming with a plurality of antennas; and
  a second receiver configured to receive a signal transmitted from the second transmitter,
  wherein the second transmitter determines an optimization influence of the second transmitter based on channel information of the second transmitter and the first transmitter and calculates a beamforming vector for performing beamforming on the first receiver and the second receiver irrespective of channel information between the second transmitter and the wiretapper, according to the optimization influence,
  wherein the second transmitter is configured as a secondary user's device that leases a frequency allocated to a primary user corresponding to the first transmitter.

6. The secure communication system of claim 5, wherein the second transmitter calculates a first beamforming vector for beamforming in a direction that does not cause interference to the first receiver, and calculates a second beamforming vector for satisfying minimum service-quality requirements of the second receiver.

7. The secure communication system of claim 6, wherein,
  the first beamforming vector is a Zero-Forcing (ZF) beamforming vector that is calculated based on channel information between the second transmitter and the first receiver and channel information between the second transmitter and the second receiver, and
  the second beamforming vector is a Maximum Ratio Transmission (MRT) beamforming vector that is calculated based on the channel information between the second transmitter and the second receiver.

8. The secure communication system of claim 7, wherein the second transmitter calculates the beamforming vector through linear combination of the ZF beamforming vector and MRT beamforming vector and a real-number constant between 0 and 1.

9. The secure communication method of claim 5, wherein,
  each of the first transmitter and first receiver is a primary user's communication device leasing a frequency, and
  each of the second transmitter and second receiver is a secondary user's communication device that leases a frequency from the primary user.

* * * * *